United States Patent
Qarish et al.

(10) Patent No.: US 12,489,300 B2
(45) Date of Patent: Dec. 2, 2025

(54) ELECTRIC CHARGER FOR AERONAUTICAL MAINTENANCE EQUIPMENT

(71) Applicant: GUINAULT SA, Saint Cyr en Val (FR)

(72) Inventors: Issa Qarish, Saint Cyr en Val (FR); Jérémy Berthelot, Saint Cyr en Val (FR); Lionel Clermont, Saint Cyr en Val (FR)

(73) Assignee: GUINAULT SA, Saint Cyr en Val (FR)

( * ) Notice: Subject to any disclaimer, the term of this patent is extended or adjusted under 35 U.S.C. 154(b) by 888 days.

(21) Appl. No.: 17/764,948

(22) PCT Filed: Sep. 22, 2020

(86) PCT No.: PCT/EP2020/076447
§ 371 (c)(1),
(2) Date: Mar. 29, 2022

(87) PCT Pub. No.: WO2021/063752
PCT Pub. Date: Apr. 8, 2021

(65) Prior Publication Data
US 2023/0023933 A1     Jan. 26, 2023

(30) Foreign Application Priority Data

Sep. 30, 2019  (FR) ...................................... 1910801

(51) Int. Cl.
*H02J 7/00*      (2006.01)
*B64F 1/35*      (2024.01)
(Continued)

(52) U.S. Cl.
CPC ............ *H02J 7/00032* (2020.01); *B64F 1/35* (2024.01); *B64F 5/40* (2017.01); *H02J 7/0042* (2013.01);
(Continued)

(58) Field of Classification Search
CPC ..... H02J 7/00712; H02J 7/0042; H02J 7/0047
See application file for complete search history.

(56) References Cited

U.S. PATENT DOCUMENTS

| | | |
|---|---|---|
| 2014/0210399 A1 | 7/2014 | Urschel et al. |
| 2015/0380955 A1 | 12/2015 | Urschel et al. |
| 2017/0302888 A1* | 10/2017 | Mehrholz ............... H02J 9/062 |

FOREIGN PATENT DOCUMENTS

| | | | |
|---|---|---|---|
| EP | 3232533 A1 | 10/2017 | |
| WO | WO 2005/119877 A1 | 6/2015 | |

(Continued)

OTHER PUBLICATIONS

Search Report from the French Intellectual Property Office on corresponding FR application (FR1910801) dated Mar. 19, 2020.

(Continued)

*Primary Examiner* — Robert Grant
(74) *Attorney, Agent, or Firm* — Alumen IP Law PC

(57) ABSTRACT

The invention concerns a charger for aeronautical maintenance equipment, the charger comprising at least one so-called "high-frequency" input electrical connector comprising a plurality of power supply pins capable of receiving a three-phase AC voltage delivered by an external power supply source at a frequency of 400 Hz, and two detection pins, a so-called "high-frequency" charging module, connected to the at least one high-frequency input electrical connector, intended to be connected to a power storage module of the aeronautical maintenance equipment, and capable of converting the AC voltage received at the plurality of power supply pins of the high-frequency input electrical connector into a DC voltage for charging the storage module, and a control module capable of generating a detection voltage between the detection pins of the high-frequency input electrical connector allowing the external power supply source, when it detects the detection voltage, (Continued)

to authorize the supply of the AC voltage to the plurality of power supply pins of the high-frequency input electrical connector.

19 Claims, 3 Drawing Sheets

(51) Int. Cl.
*B64F 5/40* (2017.01)
*H02J 7/02* (2016.01)
*H02J 9/04* (2006.01)
*B60L 53/16* (2019.01)
*B60L 53/54* (2019.01)

(52) U.S. Cl.
CPC ........ *H02J 7/0047* (2013.01); *H02J 7/00712* (2020.01); *H02J 7/02* (2013.01); *H02J 9/04* (2013.01); *B60L 53/16* (2019.02); *B60L 53/54* (2019.02); *H02J 2207/20* (2020.01)

(56) References Cited

FOREIGN PATENT DOCUMENTS

WO    WO 2015/088612 A1    6/2015
WO    WO 2019/182643 A2    9/2019

OTHER PUBLICATIONS

International Search Report and Written Opinion on corresponding PCT application (PCT/EP2020/076447) from International Searching Authority (EPO) dated Oct. 23, 2020.

\* cited by examiner

ELECTRIC CHARGER FOR AERONAUTICAL MAINTENANCE EQUIPMENT

TECHNICAL FIELD

The invention relates to the high-power rapid charging of equipment provided with an electric energy storage battery in an aeronautical zone, and more particularly to an electrical charger for aeronautical maintenance equipment as well as aeronautical maintenance equipment comprising such a charger. The invention is especially aimed at enabling a high-power rapid charging of an aeronautical maintenance equipment battery without modifying the existing infrastructure of the aeronautical zone.

BACKGROUND

In an airport zone, it is known to use a Battery Ground Power Unit or Battery GPU) in order to supply an aircraft with electric energy, especially during maintenance operations.

In a known manner, such a unit comprises, being connected in series and in this order: an input electrical connector, an on-board charging module, a battery, an inverter and an output electrical connector.

The on-board charging module, known as the "On Board Charger" or OBC, makes it possible to supply the battery with a DC voltage in order to recharge it with electric energy. This DC voltage is obtained by connecting, via the electrical input connector, the on-board charging module to a domestic power grid supplying an AC voltage of between 200 and 400V at a frequency of between 45 and 65 Hz, depending on whether the wiring is single-phase or three-phase.

In order to supply electric power to the aircraft, the ground power unit is moved to the aircraft and connected to said aircraft via the electrical output connector and an electrical cable. The energy stored in the battery is then delivered as a DC voltage to the inverter, which converts it to an AC voltage whose frequency is identical to the frequency of the AC voltage of the aircraft electrical system.

When the electric energy level of the battery is low, it is necessary to connect the ground power unit to the domestic 50 Hz or 60 Hz power grid to recharge said battery. However, in some airport zones, points of connection to the domestic power grid may be far from the aircraft parking points, making it necessary to move the ground power unit to the nearest available connection point to recharge the battery. Furthermore, in some airport zones, connection points to the domestic electrical grid may be unavailable or not sufficient in number, especially when multiple battery-powered ground power units need to be recharged simultaneously, which is a significant drawback because aircraft need to be quickly power supplied during a stopover, especially during a short stopover.

Furthermore, some electrical equipment with high-capacity batteries, for example in the order of 200 to 300 kWh, cannot be rapidly recharged from the voltage supplied by a standard domestic power grid with a frequency between 45 Hz and 65 Hz because the domestic power grid does not always provide the level of amperage required to achieve the power needed for a rapid charge.

Thus, there is a need for a reliable and efficient solution that at least partially addresses these drawbacks.

SUMMARY

To this end, one object of the invention is a charger for aeronautical maintenance equipment, said charger comprising:

at least one so-called "high-frequency" electrical input connector comprising a plurality of supply pins able to receive a three-phase AC voltage delivered by an external power source at a frequency in the order of 400 Hz, and two detection pins, a so-called "high-frequency" charging module, connected to said at least one high-frequency input electrical connector and for being connected to an electric energy storage module of said aeronautical maintenance equipment, said high-frequency charging module being capable of converting the AC voltage received on the plurality of power supply pins of the high-frequency input electrical connector into a DC voltage for charging said storage module, a control module able to generate a detection voltage across the detection pins of the high-frequency input electrical connector enabling the external power source, upon detecting said detection voltage, to allow supply of the AC voltage to the plurality of supply pins of the high-frequency input electrical connector.

The charger is to be on-board, that is mounted, in aeronautical maintenance equipment. By the term "aeronautical maintenance equipment", it is meant mobile or stationary equipment comprising an electric energy storage module, for example of the battery type, and which is present in an aeronautical zone for the maintenance of an aircraft. By "maintenance", it is meant an equipment for carrying out operations for assisting, serving, maintaining or preparing an aircraft with the aim of its takeoff, such as for example to be supplied with electric power, to be air-conditioned, to be refueled, to be de-iced, to be thrusted, etc. Such an aeronautical maintenance equipment may for example be a Battery Ground Power Unit (Battery GPU), a battery Air Conditioning Unit (ACU), a battery push-back tractor, a battery elevating platform, a battery mobile stair, a battery air start compressor, etc. By the term "aeronautical zone", it is meant an aircraft maintenance zone such as, for example, an airport zone, an aircraft manufacturing zone, an aircraft maintenance zone, or any zone in which in particular battery-powered equipment that may be recharged from 400 Hz AC voltage is used.

The charger according to the invention makes it possible to charge the battery of an aeronautical maintenance equipment from an electric power source capable of delivering an AC voltage at a frequency in the order of 400 Hz. Sources that can deliver an AC voltage, for example 200V between phases at 400 Hz, are common in aeronautical zones. They are for example generators, ground power units (GPU), thrust tractors (called "push-back tractor" by those skilled in the art) equipped with on-board electric power generators, 50-60 Hz/400 Hz AC/AC converters supplying airplanes, etc. Since such power sources are common and multiple and generally of high power (above 90 kW), it is thus easy and fast to recharge the storage module of the aeronautical maintenance equipment.

According to a characteristic of the invention, the geometry of the power supply pins and of the detection pins of the high-frequency input electrical connector dictates, upon connecting the external power source to the high-frequency input electrical connector, the complete connection of the power supply pins in a first time and then the connection of the detection pins in a second time, the 400 Hz AC voltage being delivered only once the detection voltage has been detected between the two detection pins by the external electric power source. This principle prevents the presence of a voltage and therefore an electric arc before the complete connection of the phases of the high-frequency input electrical connector, such an arc being potentially dangerous for the operator making the connection. In other words, the detection voltage generated by the control module allows the power source to electrically detect the charger, that is, to detect that the connection is fully completed, in order to avoid the formation of an electric arc between the supply pins of the high-frequency input electrical connector and the external power source.

Preferably, the high-frequency input electrical connector is in accordance with international standard IS0461 or the like (so-called "airplane" connector) and is therefore compatible with 400 Hz power sources in aeronautical zones, especially for power ratings in the order of 90 kVA or current intensities in the order of 260A.

Preferably, the high-frequency input electrical connector comprises four supply pins: three phases and a neutral.

Preferably, the two detection pins are in accordance with international standard IS0461.

Advantageously, the control module is able to receive a setpoint from a monitoring module (called BMS for "Battery Management System") of the storage module and to regulate the DC voltage supplied by the high-frequency charging module as a function of said setpoint.

Advantageously, the control module is connected to the monitoring module on a communication link of the CAN (Controller Area Network) bus type.

In one embodiment, the charger comprises a plurality of high-frequency input electrical connectors, for example two or three high-frequency input electrical connectors, in order to increase charging power of the charger. For example, if charging is possible with a power of 90 kVA on one high-frequency input electrical connector, then two high-frequency input electrical connectors will allow charging at a power of 180 kVA and thus the storage module to be charged more quickly.

According to one aspect of the invention, the high-frequency charging module comprises a voltage rectifier, which may be passive or active, capable of converting the AC voltage input from the high-frequency charging module into a DC voltage, and a step-up converter, capable of transforming the DC voltage provided by the rectifier into a DC voltage with a higher value.

Preferably, the step-up converter comprises a DC-to-AC voltage conversion stage, an AC-to-DC voltage conversion stage and a high-frequency transformer connected between the DC-to-AC voltage conversion stage and the AC-to-DC voltage conversion stage. Advantageously, the high-frequency transformer allows the DC output voltage of the high-frequency charging module to be adapted to the desired value for recharging the storage module and the high-frequency charging module to be galvanically insulated from the storage module when they are electrically connected to each other.

In one embodiment, the charger comprises:
  at least one so-called "low-frequency" input electrical connector distinct from the at least one high-frequency input electrical connector and capable of receiving a single-phase or three-phase AC voltage delivered by an external power source at a frequency of between 45 and 65 Hz,
  a so-called "low-frequency" charging module, connected on the one hand to the at least one low-frequency input electrical connector and for being connected to the storage module, said low-frequency charging module being capable of converting the AC voltage received on the at least one low-frequency input electrical connector into a DC voltage enabling the storage module to be charged.

Preferably, the at least one low-frequency input electrical connector is able to receive a single-phase or three-phase AC voltage delivered by an external power source at a frequency in the order of 50 or 60 Hz.

The presence of at least one low-frequency input electrical connector and at least one high-frequency input electrical connector allows the use of external power sources operating at frequencies of 50 or 60 Hz (for example, a domestic power grid) as well as at frequencies of 400 Hz, at which frequency most of the power sources available in the aeronautical zones operate.

Advantageously, the charger comprises a plurality of, for example two or three, low-frequency electrical input connectors.

In one embodiment, the low-frequency charging module and the high-frequency charging module are implemented by two distinct physical entities, for example two different electronic circuits with their own components allowing for one to convert a 50 or 60 Hz AC voltage into DC voltage and for the other to convert a 400 Hz AC voltage into DC voltage.

In this case, advantageously the control module is able to detect connection of an external power source to the at least one high-frequency input electrical connector or the at least one low-frequency input electrical connector and to electrically connect the at least one high-frequency input electrical connector to the high-frequency charging module when the connection has been detected on the at least one high frequency input electrical connector or the at least one low-frequency input electrical connector to the low-frequency charging module when the connection has been detected on the at least one low-frequency input electrical connector.

In one embodiment, the low-frequency charging module and the high-frequency charging module are implemented by a same physical entity in a single low-frequency or high-frequency charging module, for example a single electronic circuit with common components for converting both a 50 or 60 Hz AC voltage and a 400 Hz AC voltage into DC voltage.

In this case, advantageously, the control module is able to detect connection on the at least one high-frequency input electrical connector or on the at least one low-frequency input electrical connector and to adapt operation of the low-frequency or high-frequency charging module as a function of the frequency of the AC voltage supplied on the input electrical connector detected, that is, especially to command semiconductors or switching of power transistors in order to perform conversion of the AC voltage according to whether its frequency is 50-60 Hz or 400 Hz.

For example, the control module may be able to connect respectively the high-frequency input electrical connector to the high-frequency charging module via a contactor, for example a three-phase contactor, or the low-frequency input electrical connector to the low-frequency charging module via a contactor, for example a three-phase contactor, when an external power source is connected respectively to the high-frequency input electrical connector or to the low-frequency input electrical connector.

Advantageously, the control module is able to determine or receive information on the charging power of the external power source and to adapt the charging current of the storage module as a function of said charging power information. Such functionality allows for determining the charging current limit of the storage module as a function of the external power source. The adaptation of the charging current intensity may be done manually, for example via a human-machine interface, or automatically in a step-by-step mode.

The invention also relates to an aeronautical maintenance equipment for use in an aeronautical zone, said aeronautical maintenance equipment comprising:
 a charger as previously set forth,
 a storage module, connected to said charger, able to store electric energy when said storage module is supplied with a DC voltage delivered by said charger.

The aeronautical maintenance equipment may be mobile or stationary. The aeronautical maintenance equipment may be a battery ground power unit (Battery GPU), a battery push-back tractor, a battery powered 50 or 60 Hz AC to 400 Hz AC voltage converter, etc.

In one embodiment, especially of the ground power unit type, the aeronautical maintenance equipment further comprises an inverter, connected to the storage module and able to convert a DC voltage supplied by the storage module into a 400 Hz AC voltage adapted to electrically supply an aircraft, and an electrical output connector connected to said inverter and able to be connected to an aircraft via an electrical cable.

Advantageously, the aeronautical maintenance equipment comprises, between the inverter and the output electrical connector, a contactor able to connect or not the inverter to the output electrical connector.

Even more advantageously, the aeronautical maintenance equipment may comprise a power generation module (called "Range Extender") connected to the storage module, for example via a contactor commanded by the control module, capable of producing a high-frequency or low-frequency DC or AC voltage from a fuel or a fuel cell in order to recharge the storage module.

Preferably, the power generation module is connected to the storage module via the control module and the control module is able to connect to the storage module, at a given time, one and only one of the high-frequency charging module, the power generation module or, if applicable, the low-frequency charging module.

The invention also relates to a set of pieces of aeronautical maintenance equipment comprising a first piece of aeronautical maintenance equipment, as previously set forth, and a second piece of aeronautical maintenance equipment, electrically connected to said first piece of aeronautical maintenance equipment and making up an external power source capable of delivering a 50/60 Hz single-phase or 50/60 Hz three-phase or 400 Hz three-phase AC voltage.

The invention also relates to a system comprising aeronautical maintenance equipment as previously set forth and an external power source, electrically connected to said aeronautical maintenance equipment, said external power source being able to deliver a 50/60 Hz single-phase or 50/60 Hz three-phase or 400 Hz three-phase AC voltage, in order to charge the storage module of the aeronautical maintenance equipment via the charger of said aeronautical maintenance equipment.

According to one aspect of the invention, the external power source comprises an engine, an electric motor, or a fuel cell. The external power source may for example be an electric power unit, a stationary or mobile 50, 60 or 400 Hz under-airplane power supply, a push-back tractor equipped with a high-frequency or low-frequency electric power unit. Especially, the push-back tractor may provide energy if it is equipped with an on-board power unit, or an electric power unit that can, for example, deliver a voltage between 45 and 65 Hz.

The invention also relates to an aeronautical system comprising an aeronautical maintenance equipment as set forth above, such as a battery ground power unit (Battery GPU) and an aircraft, said aeronautical maintenance equipment being electrically connected to said aircraft.

The invention also relates to a method for charging an electric energy storage module of an aeronautical maintenance equipment as set forth above by an external power source capable of delivering a three-phase AC voltage delivered at a frequency in the order of 400 Hz, said method comprising the steps of:
 electrically connecting the external power source to the at least one high-frequency input electrical connector of the aeronautical maintenance equipment charger so as to deliver a three-phase AC voltage at a frequency in the order of 400 Hz,
 converting, by the high-frequency charging module of the aeronautical maintenance equipment charger, said AC voltage to a DC voltage,
 charging the storage module of the aeronautical maintenance equipment from said DC voltage.

Preferably, the method comprises, in the step of electrically connecting the external power source to the at least one high-frequency input electrical connector, previously detecting by the external power source the detection voltage generated by the control module followed by supplying the high-frequency input electrical connector with AC voltage from the external power source.

BRIEF DESCRIPTION OF THE DRAWINGS

Further characteristics and advantages of the invention will become more apparent upon reading the following description. The latter is purely illustrative and should be read in conjunction with the appended drawings in which.

DETAILED DESCRIPTION

The charger according to the invention is to be on-board an aeronautical maintenance equipment of an aeronautical zone such as, for example, an airport zone, an aircraft manufacturing or maintenance hangar, a civil or military air base, etc. Such an aeronautical maintenance equipment may be mobile (cart, tractor, . . . ) or stationary, that is mounted at an aircraft parking point, for example in the ground or in a technical room, in a box or in a cabinet. The aeronautical maintenance equipment comprises an electric energy storage module that needs to be recharged when its energy level is low. The aeronautical maintenance equipment may be, for example, a Battery Ground Power Unit (GPU), a battery-powered push-back tractor, or any other battery-electric equipment that requires recharging. The electric energy storage module of the aeronautical maintenance equipment is capable of being recharged from an external power source delivering an AC voltage of frequency 400 Hz, or optionally even 50 or 60 Hz, such power sources being common in aeronautical zones and especially in airports.

Aeronautical Equipment 1

Figure 1:
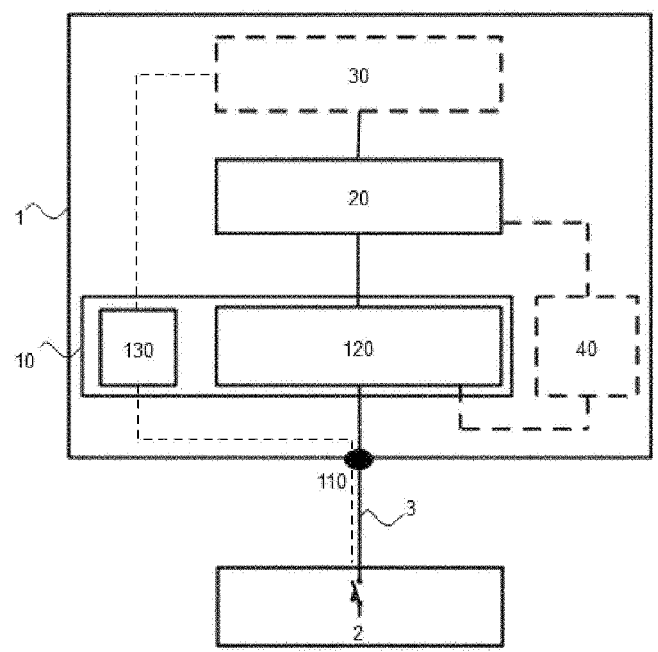
FIG. 1 schematically illustrates an embodiment of the aeronautical maintenance equipment according to the invention.

One embodiment of the aeronautical maintenance equipment 1 according to the invention has been represented in FIG. 1. The aeronautical maintenance equipment 1 comprises a charger 10 according to the invention and a storage module 20 connected to said charger 10. In FIG. 1, the aeronautical maintenance equipment 1 is electrically connected to an external power source 2 allowing electrical charging of said storage module 20 via said charger 10.

The storage module 20 is electrically rechargeable in order to store electric energy that it can then release. More specifically, in a charge mode, the storage module 20 is able to store electric energy when a DC voltage provided by the external power source 2 via the charger 10 is inputted to said storage module 20. In a discharge mode, the storage module 20 is able to output a DC output voltage to supply an entity internal or external to the aeronautical maintenance equipment 1. The storage module 20 may be especially in the form of an electric battery or a plurality of electric batteries, for example of the lithium-ion type, in a manner known per se.

Figure 2:
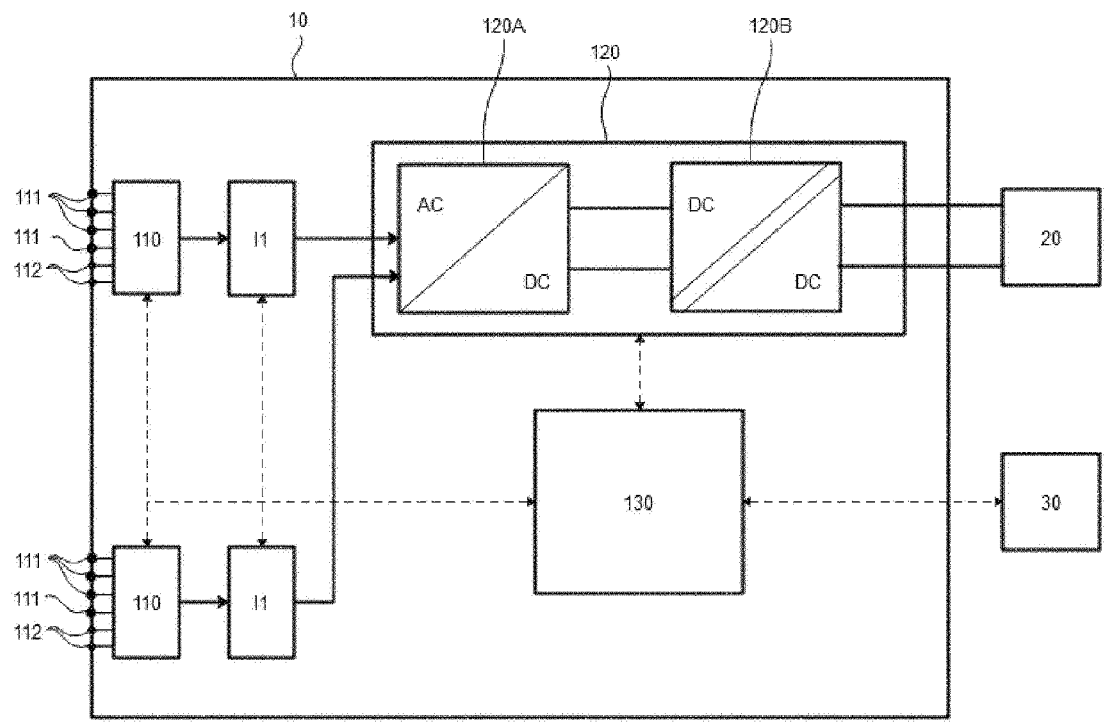
FIG. 2 schematically illustrates a first embodiment of the charger according to the invention.

FIG. 2 schematically illustrates a first embodiment of the charger 10 according to the invention.

Charger 10

Figure 3:
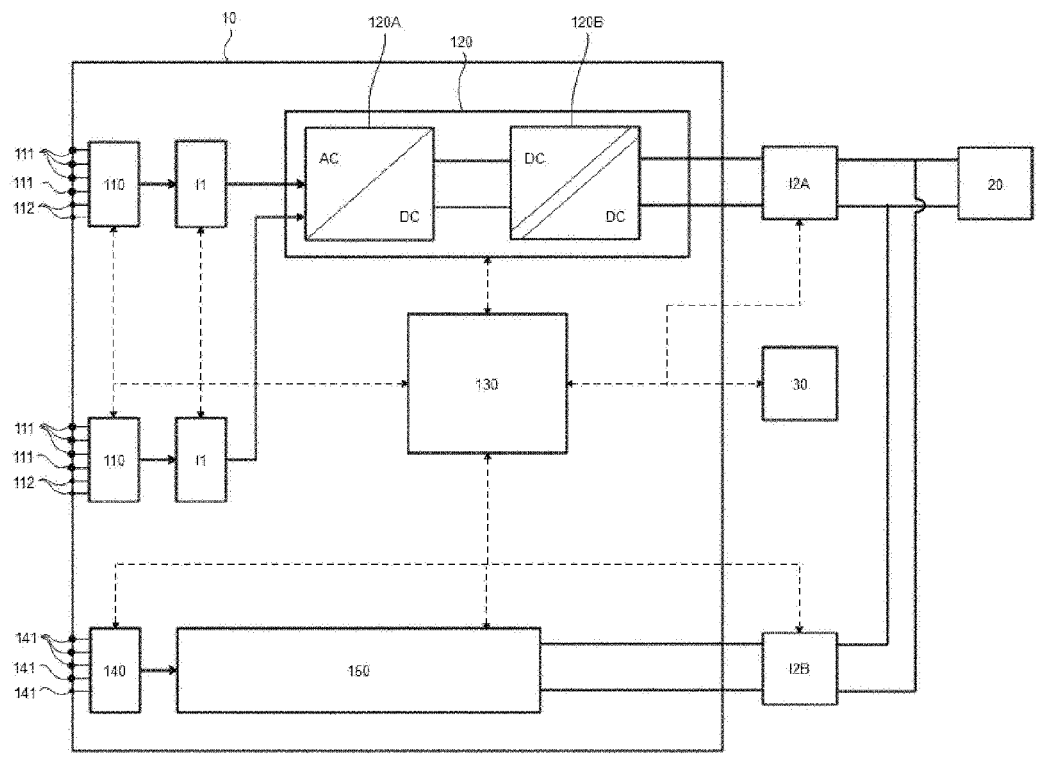
FIG. 3 schematically illustrates a second embodiment of the charger according to the invention in which the high-frequency charging module and the low-frequency charging module are two distinct physical entities.
Figure 4:
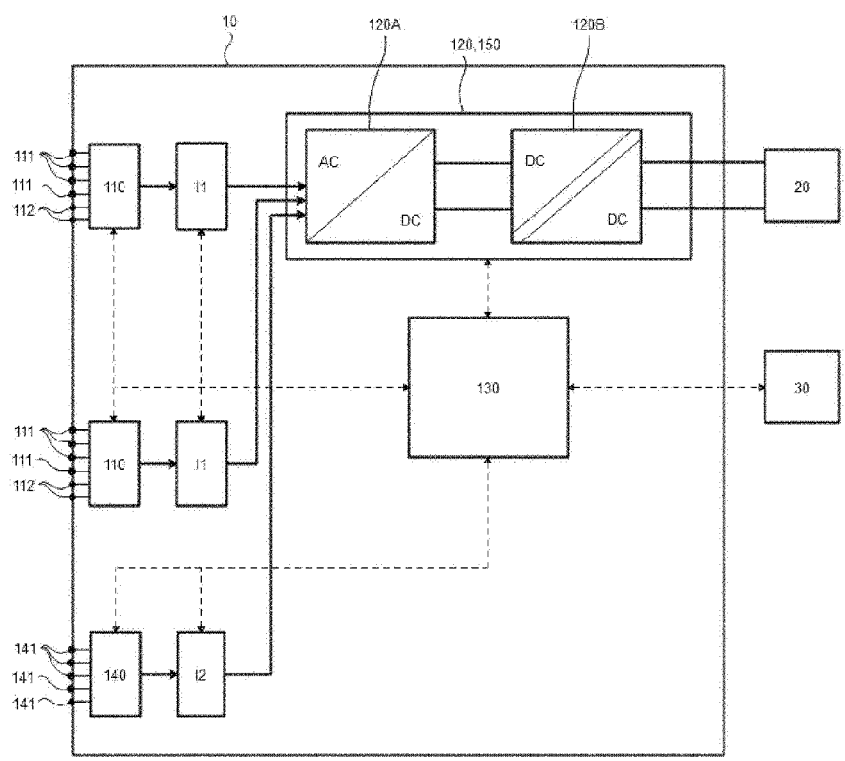
FIG. 4 schematically illustrates the second embodiment of the charger according to the invention in which the high-frequency charging module and the low-frequency charging module are implemented by one and a single physical entity.

The charger 10 comprises at least a so-called "high-frequency" electrical input connector 110, a so-called "high-frequency" charging module 120 and a control module 130. In the examples of FIGS. 2 through 4, the charger 10 comprises two high-frequency input electrical connectors 110, but of course, in other embodiments, the charger 10 could comprise a single high-frequency input electrical connector 110 or more than two high-frequency input electrical connectors 110.

High-Frequency Input Electrical Connector 110

The high-frequency input electrical connector 110 allows connection of the aeronautical maintenance equipment 1 to an electrical external power source 2 (not represented in FIGS. 2 through 4 for the sake of clarity) delivering a high-frequency AC voltage at a frequency of 400 Hz via an electrical cable 3 (FIG. 1). The external power source 2 may be mobile or stationary and for example may be an electric power unit operating with fuel (diesel, gasoline, bioethanol, etc.) or a fuel cell, a push-back tractor equipped with a high-frequency electric power unit, a power grid, or any other equipment capable of delivering an AC voltage at a frequency of 400 Hz, in particular equipment commonly used in aeronautical zones capable of delivering a voltage in the order of 200V between phases and with frequency 400 Hz.

The high-frequency input electrical connector 110 comprises supply pins 111 able to receive a three-phase AC voltage delivered by the external power source 2 at a frequency of 400 Hz, and two detection pins 112. In the case of a three-phase AC voltage, the supply pins 111 comprise three phase-type supply pins and one neutral-type supply pin. The geometry of the high-frequency input electrical connector 110 is such that, when connecting the external power source 2, it is necessary to fully insert the plug connectors of the external power source 2 into the supply pins 111 of the high-frequency input electrical connector 110 so that a voltage, for example 28 V, is generated across the detection pins 112. The external power source 2 generates the AC voltage only when it detects a voltage across the detection pins 112, thereby avoiding any arcing during connection. Preferably, the high-frequency input electrical connectors 110 are in accordance with international standard IS0461.

High-Frequency Charging Module 120

The high-frequency charging module 120 is connected, on the one hand, to the high-frequency input electrical connectors 110 and, on the other hand, to the storage module 20. The high-frequency charging module 120 is capable of converting the AC voltage received on the power supply pins 111 of the high-frequency input electrical connector 110 into a preferably regulated, DC voltage, for recharging said storage module 20. More precisely, the high-frequency charging module 120 is capable of converting an AC voltage of frequency 400 Hz into a DC voltage of, for example, between 300 Vdc and 900 Vdc in the case of a three-phase power supply depending on the voltage of the storage module 20, in order to supply electric energy to the storage module 20 in order to recharge it. Advantageously, the high-frequency charging module 120 is capable of regulating the DC voltage it delivers based on a setpoint received from a management module of the storage module 20, as will be described below.

In this example, with reference especially to FIGS. 2 and 4, the high-frequency charging module 120 comprises a rectifier 120A and a step-up converter 120B.

The rectifier 120A, which may be passive or active, is capable of converting the AC voltage received at the high-frequency input electrical connector 110 into a substantially DC voltage but with non-constant amplitude. The step-up converter 120B, which is active, is connected to the rectifier 120A and is able to increase value of the DC voltage supplied by said rectifier 120A.

Control Module 130

The control module 130 is able to generate a detection voltage between the detection pins 112 of the high-frequency input electrical connector 110 enabling the external power source 2 to allow supply of the AC voltage to the supply pins 111 of the high-frequency input electrical connector 110 as explained above.

A second embodiment of the charger 10 according to the invention has been represented in FIGS. 3 and 4.

In this second embodiment, the charger 10 comprises, further to the high-frequency input electrical connector 110, the high frequency charging module 120 and the control module 130, a low-frequency input electrical connector 140 and a low-frequency charging module 150.

Low Frequency Input Electrical Connector 140

The low-frequency input electrical connector 140 is distinct from the high-frequency input electrical connectors 110 and allows the aeronautical maintenance equipment 1 to be connected to an external power source (not represented in FIGS. 3 and 4) delivering, via an electrical cable, a low-frequency AC voltage, for example of 50 Hz or 60 Hz. To this end, the low-frequency input electrical connector 140 comprises five supply pins 141: three phase pins, a neutral pin, and optionally an Earth pin.

By the terms "external power source", it is meant, as previously, both mobile equipment such as, for example, a mobile or stationary power generator operating from a fossil fuel (diesel, gasoline, bioethanol, etc.) or a fuel cell, a power, especially domestic, grid, or any equipment capable of delivering an AC voltage at a frequency of between 45 and 65 Hz, for example 50 or 60 Hz, especially a voltage and a frequency of a domestic power grid, for example 230V and 50 Hz in single phase or 400V and 50 Hz in three phases.

Low-Frequency Charging Module 150

The low-frequency charging module 150 is connected, on the one hand, to said low-frequency input electrical connector 140 and, on the other hand, to the storage module 20 via the control module 130 and is capable of converting an AC voltage of frequency between 45 and 65 Hz into a DC voltage, for example between 200 Vdc and 400 Vdc in the case of a single-phase supply or between 300 Vdc and 900 Vdc in the case of a three-phase supply, depending on the voltage of the storage module 20, in order to supply electric energy to the storage module 20 in order to recharge it.

In particular, the control module 130 is able to alternately connect the high-frequency charging module 120 or the low-frequency charging module 150 when an electric power source is connected to one of the high-frequency electric power supply connectors 110 or the low-frequency electrical input connector 140, respectively.

In the example illustrated in FIG. 3, the high-frequency charging module 120 and the low-frequency charging module 150 are implemented by two distinct physical entities, that is, they are each implemented on an electronic circuit, the two electronic circuits being electrically independent of each other.

In this case, the control module 130 may advantageously be able to detect connection of an external power source to one of the high-frequency input electrical connectors 110 or to the low-frequency input electrical connector 140 and to electrically connect said high-frequency input electrical connector 110 to the high-frequency charging module 120 respectively when connection has been detected on said high-frequency input electrical connector 110 or the low-frequency input electrical connector 140 to the low-frequency charging module 150 when connection has been detected on the low-frequency input electrical connector 140. Once the connection is made, the AC voltage is converted to DC voltage by the high-frequency charging module 120 or the low-frequency charging module 150 respectively.

In the example of FIG. 4, the high-frequency charging module 120 and the low-frequency charging module 150 are implemented by one and a single entity, that is, a single electronic circuit implementing both functions.

In this case, the control module 130 is able to detect connection on one of the high-frequency input electrical connector 110 or the low-frequency input electrical connector 140 and to electrically connect said high-frequency input electrical connector 110 or the low-frequency input electrical connector 140 on which connection has been detected to the high-frequency charging module 120 or the low-frequency charging module 150, respectively. Furthermore, in this case, the rectifier 120A and the step-up converter 120B are further able to convert an AC voltage 50 or 60 Hz to a DC voltage adapted to charge the storage module 20 when the storage module 20 is connected to the charger 10.

In the embodiments illustrated in FIGS. 2 through 4, the control module 130 is able to control one or more 400 Hz three-phase contactors I1, each connected between a high-frequency input electrical connector 110 and the high frequency charging module 120.

In the case of FIG. 3, the control module 130 is able to open and close command a contactor I2A placed between the high-frequency charging module 120 and the storage module 20, and a contactor I2B placed between the low-frequency charging module 150 and the storage module 20.

In the case of FIG. 4, the control module 130 is able to control a three-phase contactor I2 connected between the low-frequency input electrical connector 140 and the low-frequency charging module 150. The control module 130 is especially configured to open and close control the three-phase contactors I1 and the three-phase contactor I2 so that:
  the three-phase contactors I1 are closed and the three-phase contactor I2 is open in order to electrically supply the storage module 20 via the high-frequency charging module 120 when said high-frequency charging module 120 is electrically supplied with a 400 Hz external power source 2 via one of the high-frequency input electrical connectors 110, or
  the three-phase contactors I1 are open and the three-phase contactor I2 is closed in order to electrically supply the storage module 20 via the low-frequency charging module 150 when said low-frequency charging module 150 is electrically supplied with a 50 or 60 Hz external power source via the low-frequency input electrical connector 140, or
  the three-phase contactors I1 are open and the three-phase contactor I2 is open in order to electrically insulate the storage module 20 from outside, especially when the aeronautical maintenance equipment 1 is not in use.

The control module 130 may be configured to detect connection of an external power source 2 to one of the at least one high-frequency input electrical connector 110 or to the low-frequency input electrical connector 140 and/or to be manually commanded by an operator, for example, via keys, a touchscreen or a mobile terminal, for example, a smartphone, in order to switch the contactors I1 (and the contactor I2 if applicable) to the desired positions.

Figure 5:
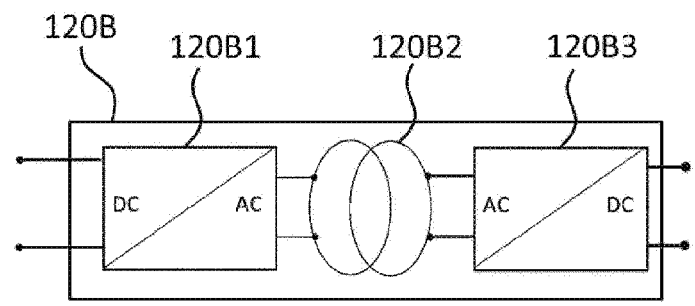
FIG. 5 schematically illustrates one advantageous example of a step-up converter of a high-frequency charging module of the charger of FIGS. 2 to 4.

One example of a step-up converter 120B that may be implemented in each of the embodiments shown in FIGS. 2 through 4 has been represented in FIG. 5. In this example, the step-up converter 120B comprises a DC to AC voltage conversion stage 120B1, an AC to DC voltage conversion stage 120B3, and a high-frequency transformer 120B2 connected between the DC to AC voltage conversion stage 120B1 and the AC to DC voltage conversion stage 120B3. The high-frequency transformer 120B2 advantageously enables the DC output voltage of the high-frequency charging module 120 to be adapted to the desired value to recharge the storage module 20 and the high-frequency charging module 120 to be galvanically insulated from the storage module 20 when the latter are electrically connected to each other.

It will be noted that in an alternative embodiment (not represented), in the case where the high-frequency charging module 120 and the low-frequency charging module 150 are implemented by a same physical entity, the charger 10 could comprise a first transformer between the contactor I1 and the high-frequency/low-frequency charging module 120, 150, and a second transformer between the contactor I2 and the high-frequency/low-frequency charging module 120, 150. The first transformer, a three-phase 400 Hz step-up transformer, would transform the 3×200V 400 Hz voltage into a 3×400V 400 Hz voltage. The second transformer, three-phase 50 Hz power, would insulate from the 50 Hz external power source. Thus the voltage level at the input of the rectifier 120A would always be the same and independent of the high (400 Hz) or low (50 or 60 Hz) frequency.

With reference to FIGS. 1 to 4 and in an advantageous manner, the aeronautical maintenance equipment 1 may comprise a monitoring module 30, for example of the BMS (Battery Monitoring System) type, capable of sending a voltage set point to the control module 130 of the charger 10 so that the control module 130 controls the high-frequency charging module 120 or the low-frequency charging module 150, as appropriate, in order to adjust its output voltage to said set point. To this end, the monitoring module 30 and the control module 130 may, for example, be connected by a CAN (Controller Area Network) bus type communication link. The setpoint may, for example, be generated by the monitoring module 30 as a function of the voltage defined across the storage module 20. The monitoring module 30 may especially measure said voltage and determine a set point allowing the storage module 20 to be charged, preferably optimally.

Referring again to FIG. 1, the aeronautical maintenance equipment 1 may also advantageously comprise a power generation module 40 capable of producing a low or high-frequency DC or AC voltage from a fossil fuel such as, for example, diesel or gasoline. Alternatively, the power generation module 40 could comprise a fuel cell coupled to a hydrogen tank to generate power. This power generation module 40, called a "range extender", makes up a power generator on-board the aeronautical maintenance equipment 1. A DC voltage generated by the power generation module 40 enables the storage module 20 to be directly charged, while an AC voltage may be input by the power generation module 40 to the high-frequency charging module 120 or the low-frequency charging module 150 in order to be converted to a DC voltage to charge the storage module 20.

Preferably, at a given instant, only one of the high-frequency charging module 120, the low-frequency charging module 150, and the power generation module 40 is electrically connected to the storage module 20.

Figure 6:
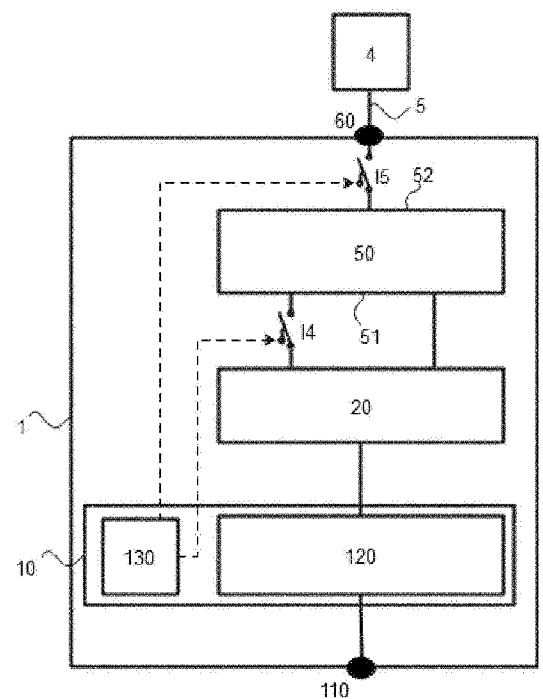
FIG. 6 schematically illustrates one exemplary implementation of the invention in which the aeronautical maintenance equipment is a ground power unit.

One particular embodiment of the aeronautical maintenance equipment 1 according to the invention has been represented in FIG. 6. In this embodiment, the aeronautical maintenance equipment 1 is of the battery ground power unit (Battery GPU) type and comprises, further to a high-frequency input electrical connector 110, the charger 10 and the storage module 20, an inverter 50 and an output electrical connector 60.

Inverter 50

The inverter 50 is connected to the storage module 20 and is able to convert DC voltage provided by said storage module 20, received at a so-called "DC" interface 51, into an adapted AC voltage, provided at a so-called "AC" interface 52, in order to electrically supply an aircraft 4, for example at a 200V AC voltage between phases oscillating at a frequency of 400 Hz.

Electrical Output Connector 60

The electrical output connector 60 is connected to the inverter 50 and is connected to the aircraft 4 via an electrical cable 5.

In this embodiment, the aeronautical maintenance equipment 1 advantageously comprises a contactor 14 and a contactor IS, both of which may be open or close commanded by the control module 130. The contactor 14 is connected between the storage module 20 and the inverter 50 to connect or disconnect them while the contactor I5 is connected between the inverter 50 and the output electrical connector 60 also to connect or disconnect them.

Examples of Implementation

A) High Frequency Charging

In the example of the figures, an external power source may be connected to one or all of the high-frequency input electrical connectors 110. The external power source (reference 2 in FIG. 1) is, for example, an aircraft pushback tractor equipped with a high-frequency electrical generator or a ground power unit delivering a 200V phase-to-phase AC voltage at 400 Hz. When the external power source 2 is connected to the high-frequency electrical input connector 110, the control module 130 detects this connection and positions the contactor(s) I1 into the closed position. Alternatively, an operator could command the control module 130 to cause said control module 130 to switch the contactor(s) I1 into the closed position before connecting the external power source 2 to the high-frequency input electrical connector(s) 110. Once connected, the high-frequency charging module 120 converts the 400 Hz AC voltage delivered by the external power source 2 into a DC voltage to electrically supply the storage module 20 to recharge it with electric energy. Once charging is sufficient, the external power source 2 is disconnected from the aeronautical maintenance equipment 1, which may then be used to perform its original function.

B) Low-Frequency Charging

In the example of FIG. 3 or 4, the aeronautical maintenance equipment 1 is connected to a low-frequency external power source 2 which may for example in this case be an electric power unit with engine or electric motor or a stationary or mobile under-airplane power supply delivering a single-phase 230V AC voltage at 50 Hz or a three-phase 400V AC voltage at 50 Hz. When the external power source 2 is connected to the low-frequency input electrical connector 140, the control module 130 detects this connection and positions:

in the case of FIG. 3, the control module 130 places the contactor I2A to open and the contactor I2B to close. Alternatively, an operator may command the control module 130 to cause said control module 130 to switch the contactor I2A to open and the contactor I2B to close prior to connecting the external power source to the low frequency input electrical connector 140, in the case of FIG. 4, the control module 130 places the contactor 11 to open and the contactor 12 to close. Alternatively, an operator may command the control module 130 to cause said control module 130 to switch the contactor I1 to open and the contactor 12 to close prior to connecting the external power source to the low-frequency input electrical connector 140.

Once connected, the low-frequency charging module 150 converts the 50 or 60 Hz AC voltage delivered by the external power source to the low-frequency input electrical connector 140 into a DC voltage for electrically supplying the storage module 20 to recharge it with electric energy. Once sufficiently charged, the external power source is disconnected from the aeronautical maintenance equipment 1 which may then be used to perform its original function.

C) Power Supply

In the case where the aeronautical maintenance equipment 1 is a ground power unit (FIG. 6), once connected to the aircraft 4, the control module 130 switches the contactors 14 and 15 to closed if necessary (that is, if they were not) so that the storage module 20 provides a DC voltage to the DC interface 51 of the inverter 50. The inverter 50 converts this voltage to an AC voltage, for example 200V phase-to-phase at 400 Hz, on the AC interface 52, which AC voltage then enables the aircraft 4 to be electrically supplied via the electrical output connector 60 and the electrical cable 5.

D) Autonomous Recharging ("Range Extender")

When it is necessary to recharge the storage module 20 but no external power source 2 is available, an operator may command the control module 130 such that it actuates the power generation module 40 if present (FIG. 1) to produce a low or high frequency DC or AC voltage by burning fuel or via a fuel cell by recharging with dihydrogen. Once sufficient recharge is achieved, the control module 130 disconnects or commands shutdown of the power generation module 40 from the storage module 20. The aeronautical maintenance equipment 1 may then be used.

The charger 10 according to the invention thus advantageously allows the use of a 400 Hz AC voltage to charge a battery of an aeronautical maintenance equipment 1. Charging may advantageously be ultra-fast by using a plurality of high-frequency electrical input connectors 110 simultaneously connected to a plurality of external power sources 2. When the charger 10 comprises at least one low-frequency input electrical connector 140, charging may be performed both from an external power source 2 delivering a 400 Hz voltage and from an external power source delivering a 50 or 60 Hz voltage, thereby multiplying the number of sources that may be used in aeronautical zones to recharge batteries of aeronautical maintenance equipment 1. The aeronautical maintenance equipment 1 according to the invention advantageously makes it possible to use most of the external power sources 2 present in airport zones.

The invention claimed is:

1. A charger for aeronautical maintenance equipment, said charger comprising:
   at least one high-frequency input electrical connector comprising a plurality of supply pins able to receive a three-phase AC voltage delivered by an external power source at a frequency of 400 Hz, and two detection pins,
   a high-frequency charging module connected to said at least one high-frequency input electrical connector and for being connected to an electric energy storage module of said aeronautical maintenance equipment, said high-frequency charging module configured to convert the AC voltage received on the plurality of power supply pins of the at least one high-frequency input electrical connector into a direct current voltage to charge said storage module,
   a control module configured to generate a detection voltage across the detection pins of the at least one high-frequency input electrical connector for the external power source, upon detecting said detection voltage, to allow supply of the AC voltage to the plurality of supply pins of the at least one high-frequency input electrical connector, and
   wherein the control module is configured to receive a set point from a monitoring module of the storage module and to regulate the DC voltage supplied by the high-frequency charging module depending on said set point.

2. The charger according to claim 1, wherein the at least one high-frequency input electrical connector comprises a plurality of high-frequency input electrical connectors.

3. The charger according to claim 1, wherein the high-frequency charging module comprises a rectifier and a step-up converter.

4. The charger according to claim 1, comprising:
   at least one low-frequency input electrical connector distinct from the at least one high-frequency input electrical connector and configured for receiving a single-phase or three-phase AC voltage delivered by an external power source at a frequency of between 45 and 65 Hz,
   a low-frequency charging module, connected to the at least one low-frequency input electrical connector and for being connected to the storage module, said low-frequency charging module configured for converting the AC voltage received on the at least one low-frequency input electrical connector into a DC voltage for charging the storage module.

5. The charger according to claim 4, wherein the low-frequency charging module and the high-frequency charging module are implemented by a same physical entity in a single low-frequency or high-frequency charging module.

6. The charger according to claim 5, wherein the control module is configured to detect connection of an external power source to the at least one high-frequency input electrical connector or to the at least one low-frequency input electrical connector and to adapt operation of the low-frequency or high-frequency charging module depending on the frequency of the AC voltage provided on the input electrical connector detected.

7. The charger according to claim 4, wherein the low-frequency charging module and the high-frequency charging module are implemented by two distinct physical entities.

8. The charger according to claim 7, wherein the control module is configured to detect connection of an external power source to the at least one high-frequency or low-frequency input electrical connector and to electrically connect the at least one low-frequency input electrical connector to the low-frequency charging module when the connection has been detected on the at least low frequency input electrical connector or the at least one high-frequency input electrical connector to the high-frequency charging module when the connection has been detected on the at least one high-frequency input electrical connector.

9. The charger according to claim 1, wherein the control module is configured to determine or receive charging power information from the external power source and to adapt the charging current of the storage module based on said charging power information.

10. An aeronautical maintenance equipment for use in an aeronautical zone, said aeronautical maintenance equipment comprising:
    the charger according to claim 1,
    a storage module, connected to said charger, configured to store electric energy when said storage module is supplied with a DC voltage delivered by said charger.

11. The aeronautical maintenance equipment according to claim 10, comprising a power generation module, connected to the storage module, configured to produce a high-frequency or low-frequency DC or AC voltage from a fuel or a fuel cell in order to recharge the storage module.

12. A system comprising the aeronautical maintenance equipment, according to claim 10, and an external power source, electrically connected to said aeronautical maintenance equipment, said external power source being able to deliver a single-phase or three-phase 50 or 60 Hz or three-phase 400 Hz AC voltage, to charge the storage module of the aeronautical maintenance equipment via the charger of said aeronautical maintenance equipment.

13. A method for charging an electric energy storage module of the aeronautical maintenance equipment, according to claim 10, by an external power source capable of delivering a three-phase AC voltage delivered at a frequency of 400 Hz, said method comprising the steps of:

electrically connecting the external power source to the at least one high-frequency input electrical connector of the charger of the aeronautical maintenance equipment so as to deliver a three-phase AC voltage at a frequency of 400 Hz, converting, by the high-frequency charging module of the charger of the aeronautical maintenance equipment, said AC voltage into a DC voltage, charging the storage module of the aeronautical maintenance equipment from said DC voltage.

14. A charger for aeronautical maintenance equipment, said charger comprising:

at least one high-frequency input electrical connector comprising a plurality of supply pins able to receive a three-phase AC voltage delivered by an external power source at a frequency of 400 Hz, and two detection pins, a high-frequency charging module connected to said at least one high-frequency input electrical connector and for being connected to an electric energy storage module of said aeronautical maintenance equipment, said high-frequency charging module configured to convert the AC voltage received on the plurality of power supply pins of the at least one high-frequency input electrical connector into a direct current voltage to charge said storage module, a control module configured to generate a detection voltage across the detection pins of the at least one high-frequency input electrical connector for the external power source, upon detecting said detection voltage, to allow supply of the AC voltage to the plurality of supply pins of the at least one high-frequency input electrical connector, and wherein the at least one high-frequency input electrical connector comprises a plurality of high-frequency input electrical connectors.

15. The charger according to claim 14, wherein the high-frequency charging module comprises a rectifier and a step-up converter.

16. The charger according to claim 14, wherein the control module is configured to determine or receive charging power information from the external power source and to adapt the charging current of the storage module based on said charging power information.

17. A charger for aeronautical maintenance equipment, said charger comprising:

at least one high-frequency input electrical connector comprising a plurality of supply pins able to receive a three-phase AC voltage delivered by an external power source at a frequency of 400 Hz, and two detection pins, a high-frequency charging module connected to said at least one high-frequency input electrical connector and for being connected to an electric energy storage module of said aeronautical maintenance equipment, said high-frequency charging module configured to convert the AC voltage received on the plurality of power supply pins of the at least one high-frequency input electrical connector into a direct current voltage to charge said storage module, a control module configured to generate a detection voltage across the detection pins of the at least one high-frequency input electrical connector for the external power source, upon detecting said detection voltage, to allow supply of the AC voltage to the plurality of supply pins of the at least one high-frequency input electrical connector, and wherein the high-frequency charging module comprises a rectifier and a step-up converter.

18. The charger of claim 17, wherein the control module is configured to receive a set point from a monitoring module of the storage module and to regulate the DC voltage supplied by the high-frequency charging module depending on said set point.

19. The charger according to claim 17, wherein the at least one high-frequency input electrical connector comprises a plurality of high-frequency input electrical connectors.

\* \* \* \* \*